US008498735B2

(12) United States Patent
Armstrong

(10) Patent No.: US 8,498,735 B2
(45) Date of Patent: Jul. 30, 2013

(54) STORAGE METHOD FOR DIGITAL MEDIA ITEMS

(75) Inventor: Kenn Armstrong, Lawrenceville, GA (US)

(73) Assignee: NCR Corporation, Duluth, GA (US)

(*) Notice: Subject to any disclaimer, the term of this patent is extended or adjusted under 35 U.S.C. 154(b) by 207 days.

(21) Appl. No.: 13/117,705

(22) Filed: May 27, 2011

(65) Prior Publication Data

US 2012/0303155 A1 Nov. 29, 2012

(51) Int. Cl.
*G06F 7/00* (2006.01)
(52) U.S. Cl.
USPC .......................................... 700/215; 700/214
(58) Field of Classification Search
None
See application file for complete search history.

(56) References Cited

U.S. PATENT DOCUMENTS

| 2005/0245101 A1* | 11/2005 | Brill et al. ..................... 438/800 |
| 2007/0014535 A1* | 1/2007 | Rathbun et al. ................. 386/94 |
| 2010/0312380 A1* | 12/2010 | Lowe et al. .................... 700/232 |

* cited by examiner

*Primary Examiner* — Gene Crawford
*Assistant Examiner* — Lester Rushin
(74) *Attorney, Agent, or Firm* — Paul W. Martin

(57) ABSTRACT

A storage method for digital media items which optimizes delivery time. An example storage method includes determining transport times for transporting the digital media items from a plurality of primary storage locations within the entertainment kiosk to a dispense aperture of the entertainment kiosk, obtaining expected transaction rates of the digital media items, assigning the digital media items to the primary storage locations such that digital media items having expected transaction rates that are greater than expected transaction rates of other digital media items are stored in primary storage locations having transport times that are shorter than transport times of other primary storage locations.

8 Claims, 5 Drawing Sheets

STORAGE METHOD FOR DIGITAL MEDIA ITEMS

BACKGROUND

Entertainment kiosks are available which rent and/or sell digital media, including but not limited to movies, television shows, music, music videos, video game software, and a wide array of additional file types and file formats.

These kiosks may deliver digital media in various ways, including but not limited to compact discs (CDs), digital video discs (DVDs), download to portable storage devices, and wireless download to portable storage devices.

Kiosks that deliver discs include a delivery and return aperture, internal bins for storing the discs, and a transport mechanism for moving selected discs from their storage bins to the delivery aperture and back again. Storage bins may be located at various distances from the delivery aperture and result in a range of transport times.

During a transaction, a selected disc may be located in a bin located far from the delivery aperture compared to other bins so as to cause the transport mechanism to take longer to deliver the selected disc to the delivery aperture. The increased transport time may result in customer dissatisfaction.

Therefore, it would be desirable to provide a digital media item storage method which reduces transport time during a transaction.

SUMMARY

A storage method for digital media items is provided.

An example storage method includes determining transport times for transporting the digital media items from a plurality of primary storage locations within the entertainment kiosk to a dispense aperture of the entertainment kiosk, obtaining expected transaction rates of the digital media items, assigning the digital media items to the primary storage locations such that digital media items having expected transaction rates that are greater than expected transaction rates of other digital media items are stored in primary storage locations having transport times that are shorter than transport times of other primary storage locations.

Assigning the digital media items to the primary storage locations may include ranking the storage locations based upon the transport times starting with a first primary storage location having a shortest transport time and ending with a second primary storage location having a longest transport time, ranking the digital media items based upon the expected transaction rates starting with a first digital media item having a highest expected transaction rate and ending with a second digital media item having a lowest expected transaction rate, and assigning ranked digital media items to ranked primary storage locations beginning with the first digital media item being assigned to the first primary storage location.

The example storage method may be further optimized by establishing a predetermined number of temporary storage locations having transport times that are shorter than the transport times of the primary storage locations, and assigning the digital media items from the primary storage locations to the temporary storage locations during transactions involving the digital media items.

DETAILED DESCRIPTION

Figure 1:
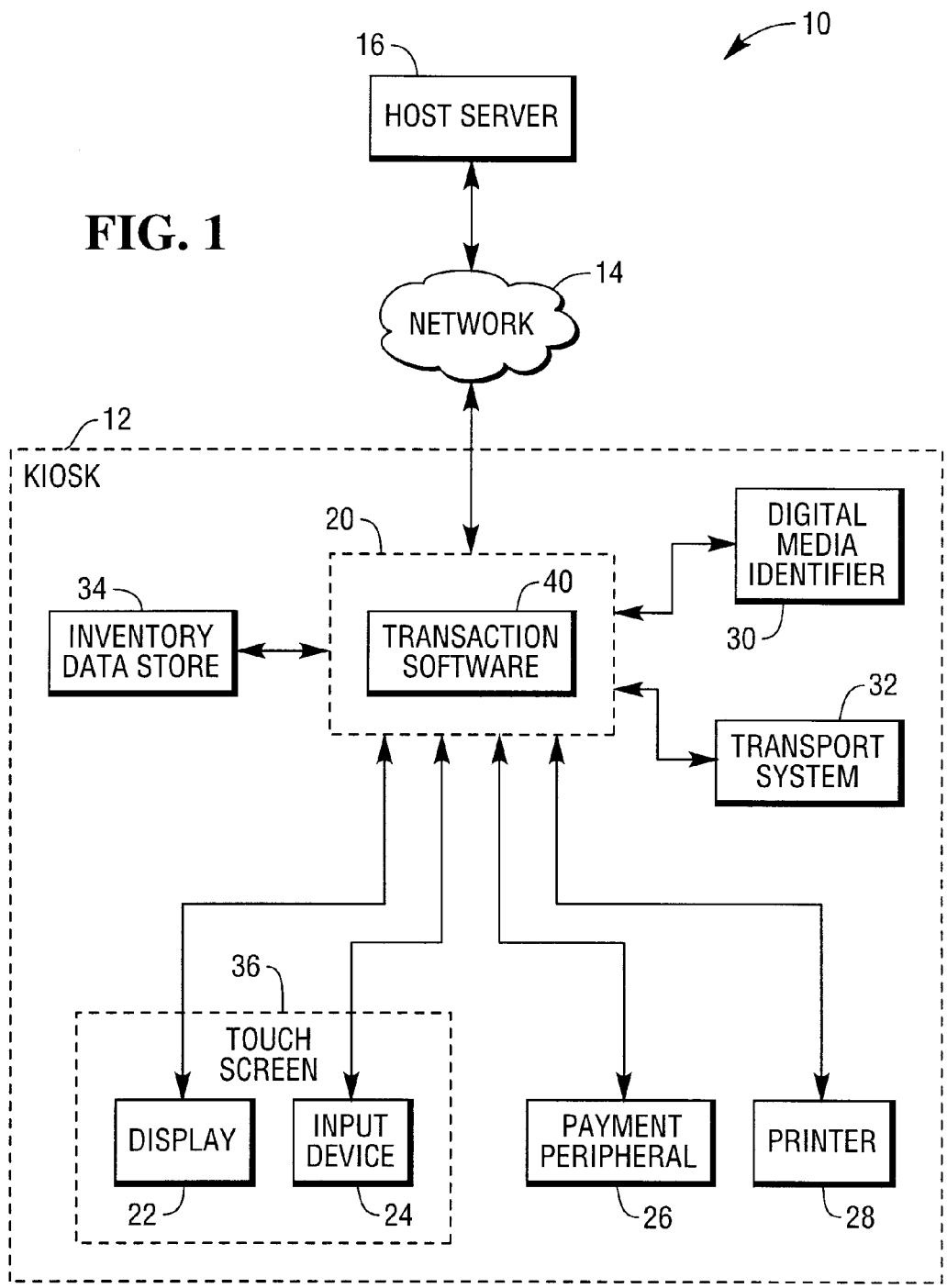
FIG. 1 is a block diagram of an example kiosk.

Referring now to FIG. 1, example entertainment kiosk 12 may include computer 20, display 22, input device 24, payment peripheral 26, printer 28, digital media identifier 30, transport system 32, and inventor data store 34.

Computer 20 includes a processor, memory, program and data storage. Computer 20 may execute an operating system such as a Microsoft operating system, and a web browser for viewing web pages.

Computer 20 controls operation of kiosk 12. Computer 20 executes software 40, which displays images of screens and records operator selections from those screens during a digital media transaction. Software 40 may include but not be limited to one or more software applications, libraries, objects, and/or modules.

A digital media transaction may include a sale of digital media items or licenses to digital media items. Digital media items may include, but not be limited to, movies, television shows, music, music videos, video game software, productivity software and a wide array of additional file types and file formats. Digital media items may be identified by title, alphanumeric, or and/other identifier.

Kiosk 12 may store multiple copies of the same digital media item. For example, kiosk 12 may store multiple copies of a newly released movie.

Display 22 displays the images of the transaction screens.

Input device 24 records operator selections during a digital media transaction. Input device 24 may include a touch sensitive device or a keyboard. Input device 24 and display 22 may be combined as a touch screen 36.

Payment peripheral 26 may include one or more of a card reader for reading payment and/or loyalty cards, a currency acceptor, a currency dispenser, a coin acceptor, and a coin dispenser.

Printer 28 includes a receipt printer, but may print additional information, such as coupons or other offers or promotions.

Digital media identifier 30 identifies digital media items. For example, digital media identifier 30 may include an RFID tag reader for reading RFID tags on digital media discs or their cases.

As another example, digital media identifier 30 may include a barcode reader for reading barcodes on digital media discs or their cases.

Transport system 32 delivers digital media items from storage locations within inside kiosk 12 to customers following identification of digital media items and payment.

Digital media identifier 30 may be located along the transport path, facilitating identification. Digital media identifier 30 may also be used to identify dispensed digital media items.

Inventory data store 34 contains an inventory of digital media items within kiosk 12, either physical discs or digital media files or both. Software 40 updates the inventory of digital media items each time a digital media item is dispensed or received. Software 40 may also send updated inventory information to host server 16 via network 14. Host server 16 may manage inventory in a plurality of kiosks 12.

Inventory data store 34 may further include expected transaction rates for each digital media item in inventory.

Network 14 may include a cellular communication network, a global communications network also known as the Internet, a wired or wireless network, or any combination of such networks.

Figure 2:
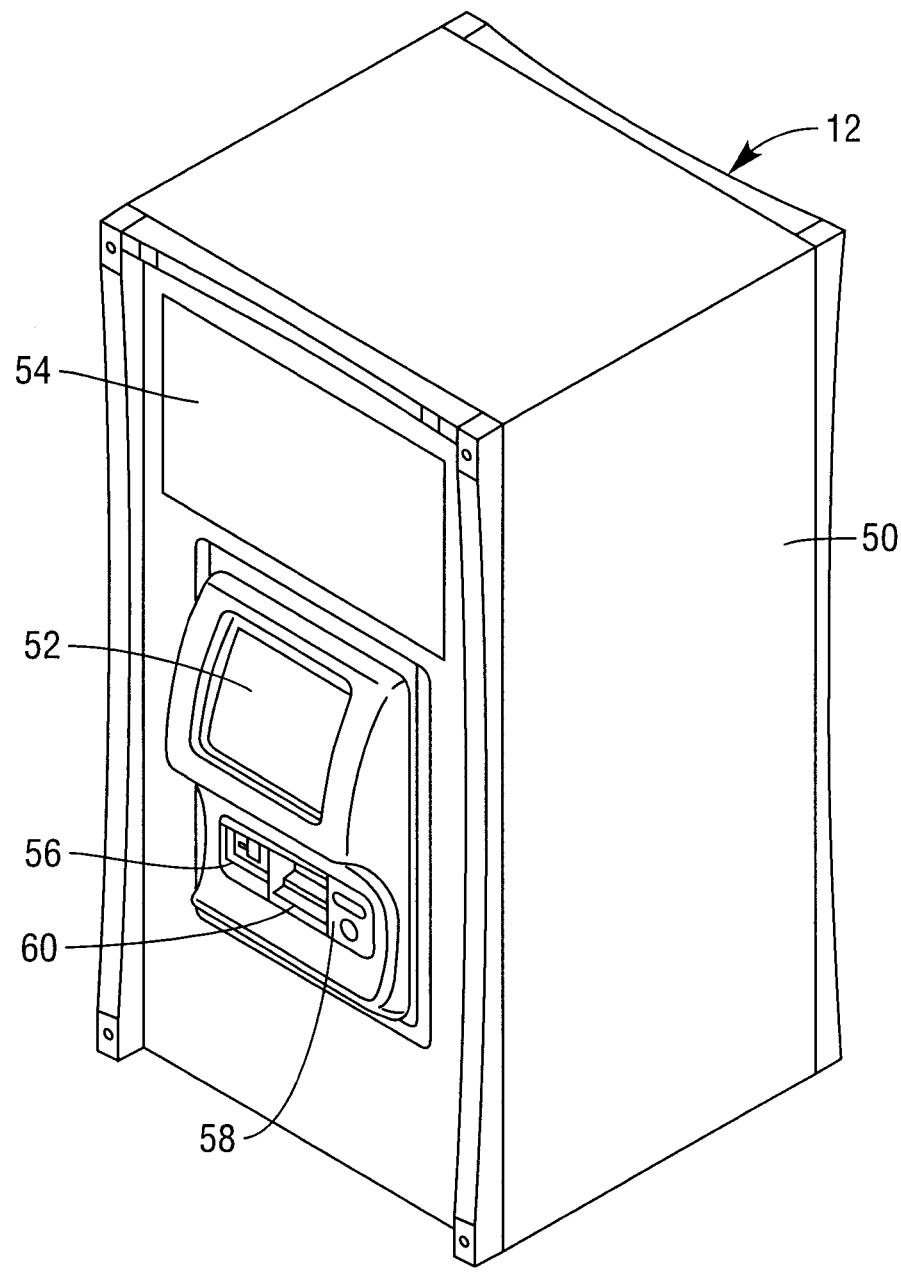
FIG. 2 is a view illustrating the example kiosk.

Referring to FIG. 2, an example kiosk 12 is illustrated. Example kiosk 12 may be based upon the entertainment kiosk disclosed in commonly-assigned published U.S. application Ser. No. 10/866,387, publication number 2004/0254676, entitled "AUTOMATED BUSINESS SYSTEM AND METHOD OF VENDING AND RETURNING A CONSUMER PRODUCT". This published application is hereby incorporated by reference.

Example kiosk 12 includes housing 50 for storing digital media items in cases. Kiosk 12 further includes touch screen 52, auxiliary display 54, card reader 56, printer 58, and dispense and retrieve aperture 60.

Auxiliary display 54 displays movie trailers, promotions, and other information under the control of software 40.

Dispense and retrieve aperture 60 includes a bin from which digital media items in cases are dispensed and into which empty cases may be inserted. Digital media identifier 30 may be located in dispense and retrieve aperture 60 or on transport system 32.

Figure 3:
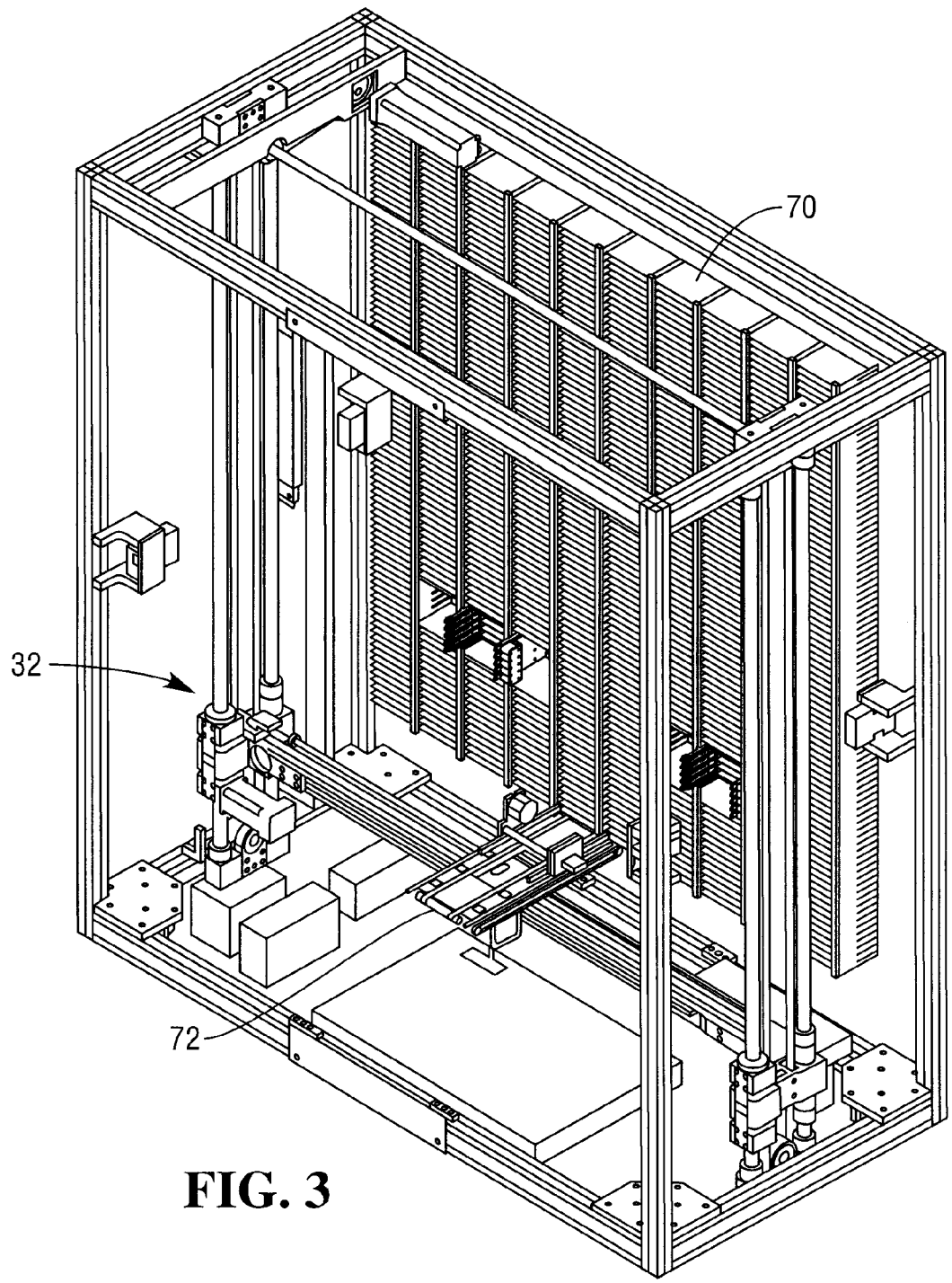
FIG. 3 is a view inside the example kiosk illustrating an example transport mechanism.

With reference to FIG. 3, transport system 32 may include a system as described in the incorporated published application, including a robot 72 capable of movement along three different directions, vertical, horizontal, and forwards/backwards. Robot 72 interacts with aperture 60 to transport digital media items as CDs or DVDs from storage bins 70 to aperture 60 and to transport returned digital media items from aperture 60 to bins 70. Even though only a back wall is illustrated in detail, bins 70 may be located along one or more inside walls with housing 50, including along a front wall adjacent aperture 60.

Also envisioned is an alternative transport system which may include a radial design capable of movement along vertical, radial, and forwards/backwards directions. With such a transport system, bins 70 may be located around transport system 32.

Figure 4:
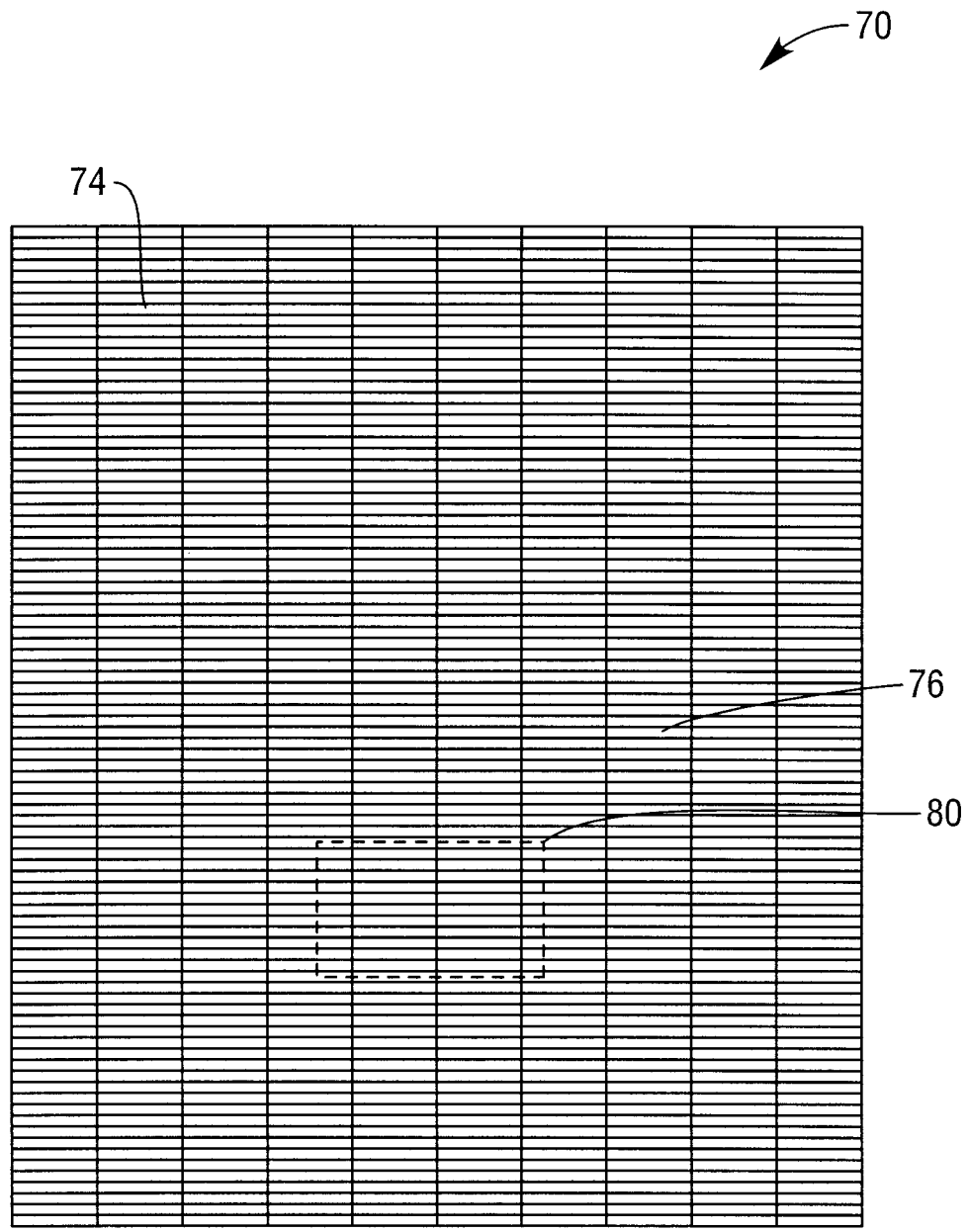
FIG. 4 is a view illustrating an example bin configuration.

With reference to FIG. 4, an example bin configuration is illustrated. Storage bins 70 are arranged in ninety rows and ten columns.

Transport system 32 takes different amounts of time to transport digital media items from bins 70 based upon the transport distance of bins 70 from aperture 60. For example, a digital media item in bin 74 will take longer to transport to aperture 60 than a digital media item in bin 76, which is closer to aperture 60.

Software 40 stores bin rankings of transport times from each bin 70 to aperture 60. Bins 70 with shortest transport times may be ranked highest. Software 40 may also perform tests to determine the transport times.

Software 40 may store digital media items in bins 70 based upon expected transaction rates for each digital media item, for example, rental rate over a predetermined period.

For example, if a particular digital media item is expected to be rented one hundred times from kiosk 12 over a period of a week and there are five copies of the particular digital media item, then the expected rental rate or expected rentals per week for one of the copies would equal twenty rentals per week.

Total motion time is minimized when the digital media items with the highest expected transaction rates are in bins 70 with the lowest transport time. Thus, software 40 stores digital media items having high expected transaction rates close in terms of transport time to aperture 60 and digital media items having low expected transaction rates farther away from aperture 60. Transport times may or may be equivalent to distances from aperture 60.

Software 40 may determine expected transaction rates for digital media items based upon historical transaction records stored locally in inventory data. Alternatively, software 40 may download expected transaction rates from host server 16. Host server 16 determines the expected transaction rates from inventory data from multiple kiosks, including kiosk 12.

Software 40 further speeds up delivery of digital media items by allocating a predetermined number of bins 70 closest to aperture 60 as temporary storage area 80 for outgoing and incoming digital media items. Temporary storage area 80 may be adjusted to include more or less bins 70, for example, based upon average numbers of digital media items per transaction.

For example, software 40 may transport a digital media item from its bin outside of temporary storage area 80 to a bin within temporary storage area 80 when the digital media item is selected. After payment is received from a customer, robot 72 may more quickly deliver the digital media item to aperture 60.

Software 40 may move digital media items in and out of temporary storage area 80 on a daily basis and after the inventory of digital media items is replenished.

Advantageously, this storage method is especially useful for transactions involving more than one digital media item, especially when the digital media items have different expected transaction rates, and therefore, different transport times from their bins 70 to aperture 60.

For example, if a customer involved in a rental transaction chooses a first digital media item having a high expected rental rate and a second digital media item having a low expected rental rate, software 40 may move the second digital media item to temporary storage 80 before the customer has completed final transaction steps to speed up its delivery. In a modification of this embodiment, software 40 may also move the first digital media item to temporary storage area 80.

During a return transaction, software 40 may transport a returned digital media item to a bin 70 within temporary storage area 80 and then later move the digital media item to a different storage bin 70 outside of temporary storage area 80, for example, when no transactions are in progress.

Figure 5:
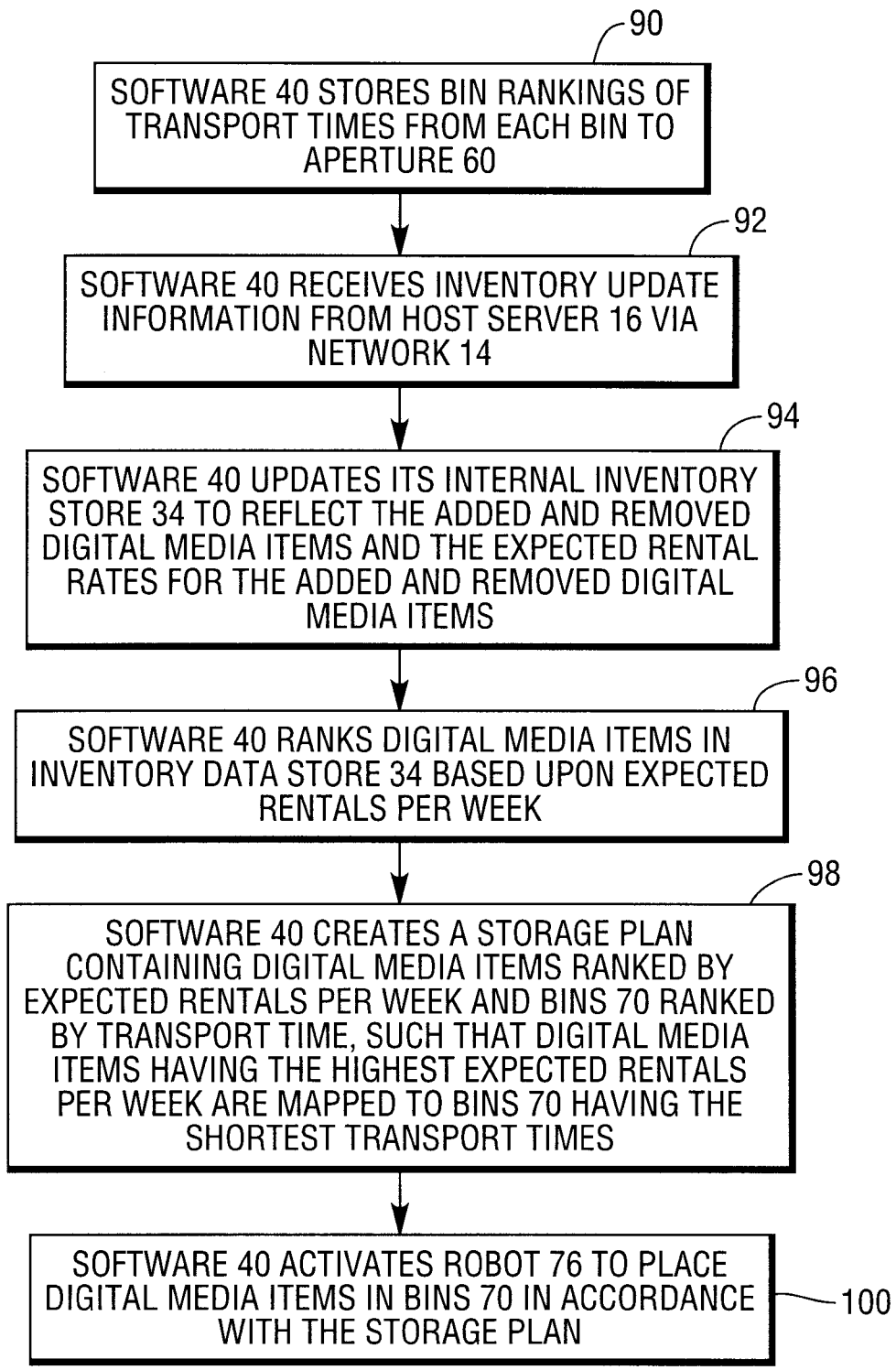
FIG. 5 is a flow diagram illustrating an example storage method.

With reference to FIG. 5, an example storage optimization method is illustrated based upon rental transactions and expected weekly rental rates.

In step 90, software 40 stores bin rankings of transport times from each bin to aperture 60. Bins 70 with shortest transport times may be ranked highest.

In step 92, software 40 receives inventory update information from host server 16 via network 14.

Inventory update information may include information regarding digital media items to be removed and digital media items to be added during servicing of kiosk 12. Inventory update information may include expected rental rates for each digital media item added to inventory, to be added to expected rental rates already stored within kiosk 12. Software 40 may receive inventory update information periodically, such as weekly as in this example.

In step 94, software 40 updates its internal inventory store 34 to reflect the added and removed digital media items and the expected rental rates for the added and removed digital media items.

In step 96, software 40 ranks digital media items in inventory data store 34 based upon expected rentals per week.

In step 98, software 40 creates a storage plan containing digital media items ranked by expected rentals per week and bins 70 ranked by transport time, such that digital media items having the highest expected rentals per week are mapped to bins 70 having the shortest transport times. The storage plan represents how the current inventory of digital media items should be stored within kiosk 12 based upon the bin configuration in the kiosk 12, e.g., the bin configuration in FIG. 4.

In step 100, software 40 activates robot 76 to place digital media items in bins 70 in accordance with the storage plan. Software 40 may use empty bins 70 in temporary storage area 80 as required to free up occupied bins 70.

It may be desirable to optimize inventory locations prior to kiosk replenishment. Software 40 may repeat optimization to make adjustments any time kiosk 12 is idle.

Advantageously, optimal storage of digital media items based upon expected rental rates and bin transport times decreases overall wait time during rental transactions. Combination of this method with temporary storage area 80 further decreases overall wait time.

Although particular reference has been made to certain embodiments, variations and modifications are also envisioned within the spirit and scope of the following claims.

The invention claimed is:

1. A method of storing digital media items in an entertainment kiosk by a processor configured to perform the steps of:
    determining transport times for transporting the digital media items from a plurality of primary storage locations within the entertainment kiosk to a dispense aperture of the entertainment kiosk by the entertainment kiosk;
    obtaining expected transaction rates of the digital media items by the entertainment kiosk;
    assigning the digital media items to the primary storage locations by the entertainment kiosk such that digital media items having expected transaction rates that are greater than expected transaction rates of other digital media items are stored in primary storage locations having transport times that are shorter than transport times of other primary storage locations.

2. The method of claim 1, wherein the obtaining step comprises:
    downloading the expected transaction rates from a host server by the entertainment kiosk.

3. The method of claim 1, wherein the obtaining step comprises:
    determining the expected transaction rates from historical transaction records by the entertainment kiosk.

4. The method of claim 1, wherein the assigning step comprises:
    ranking the storage locations based upon the transport times starting with a first primary storage location having a shortest transport time and ending with a second primary storage location having a longest transport time;
    ranking the digital media items based upon the expected transaction rates starting with a first digital media item having a highest expected transaction rate and ending with a second digital media item having a lowest expected transaction rate; and
    assigning ranked digital media items to ranked primary storage locations beginning with the first digital media item being assigned to the first primary storage location.

5. The method of claim 1, further comprising:
    establishing a predetermined number of temporary storage locations having transport times that are shorter than the transport times of the primary storage locations by the entertainment kiosk; and
    assigning the digital media items from the primary storage locations to the temporary storage locations during transactions involving the digital media items.

6. A method of storing digital media items in an entertainment kiosk by a processor configured to perform the steps of:
    determining transport times for transporting the digital media items from a plurality of primary storage locations within the entertainment kiosk to a dispense aperture of the entertainment kiosk by the entertainment kiosk;
    obtaining expected transaction rates of the digital media items by the entertainment kiosk;
    assigning the digital media items to the storage locations by the entertainment kiosk including
        ranking the primary storage locations based upon the transport times starting with a first primary storage location having a shortest transport time and ending with a second primary storage location having a longest transport time;
        ranking the digital media items based upon the expected transaction rates starting with a first digital media item having a highest expected transaction rate and ending with a second digital media item having a lowest expected transaction rate; and
        assigning ranked digital media items in order to ranked primary storage locations beginning with the first digital media item being assigned to the first primary storage location; and
    assigning the digital media items from the primary storage locations to temporary storage locations having transport times that are shorter than the transport times of the primary storage locations during transactions involving the digital media items.

7. An entertainment kiosk comprising:
    communications circuitry;
    a transaction interface including a dispense aperture;
    local storage including primary storage locations for storing digital media items;
    a robot for transporting the digital media items from the primary storage locations to the dispense aperture; and
    a processor for determining transport times for transporting the digital media items from the primary storage locations to the dispense aperture using the robot, for obtaining expected transaction rates of the digital media items from a host server via the communications circuitry, for assigning the digital media items to the primary storage locations by
        ranking the primary storage locations based upon the transport times starting with a first storage location having a shortest transport time and ending with a second storage location having a longest transport time,
        ranking the digital media items based upon the expected transaction rates starting with a first digital media item having a highest expected transaction rate and ending with a second digital media item having a lowest expected transaction rate, and
        assigning ranked digital media items in order to ranked primary storage locations beginning with the first digital media item being assigned to the first primary storage location.

8. The kiosk of claim 7, wherein the local storage further comprises temporary storage locations having transport times using the robot that are shorter than the transport times of the primary storage locations, and wherein the processor is also for assigning the digital media items from the primary storage locations to temporary storage locations during transactions involving the digital media items.

* * * * *